US005632803A

United States Patent [19]
Stoner et al.

[11] Patent Number: 5,632,803
[45] Date of Patent: May 27, 1997

[54] ENHANCED HELIUM RECOVERY

[75] Inventors: Glenn Stoner, Calhan, Colo.; Herbert E. Reingold, III, Annapolis; Joseph S. D'Amico, Linthicum, both of Md.; Kent S. Knaebel, Plain City, Ohio

[73] Assignee: Nitrotec Corporation, New York, N.Y.

[21] Appl. No.: 517,469

[22] Filed: Aug. 21, 1995

Related U.S. Application Data

[63] Continuation-in-part of Ser. No. 326,917, Oct. 21, 1994, Pat. No. 5,542,966.

[51] Int. Cl.$^6$ .................. B01D 53/47; B01D 53/22
[52] U.S. Cl. .................. 95/53; 95/101; 95/102; 95/103; 95/105; 95/130; 95/143
[58] Field of Search .................. 95/45, 47–55, 95/95–105, 130, 143, 148

[56] References Cited

U.S. PATENT DOCUMENTS

| | | | |
|---|---|---|---|
| 3,246,449 | 4/1966 | Stern et al. | 95/53 |
| 3,250,080 | 5/1966 | Garwin | 95/53 X |
| 3,324,626 | 6/1967 | Dresser et al. | 95/53 X |
| 3,636,679 | 1/1972 | Batta | 95/103 X |
| 3,683,589 | 8/1972 | Seitz et al. | 55/62 |

(List continued on next page.)

FOREIGN PATENT DOCUMENTS

| | | |
|---|---|---|
| 071553 | 7/1982 | European Pat. Off. |
| 092695 | 4/1983 | European Pat. Off. |
| 394947 | 10/1990 | European Pat. Off. |
| 04-090819 | 3/1992 | Japan .................. 95/54 |
| WO88/09306 | 12/1988 | WIPO. |

OTHER PUBLICATIONS

Methane/Nitrogen Gas Separation over the Zeolite Clinoptolite by the Selective Adsorption of Nitrogen–Ind. Gas Separations, 1983, Am. Chem Society Frankiewicz et al.

A Study of Heatless Adsorption on the System $CO_2$ in He (I) Chem Eng. Science 1972, vol. 27 pp. 1449–1458 Schemdalman et al.

Study of Heatless Adsorption in the Model System $CO_2$ in He (II); Aiche Symposium Series #134, vol. 69, 1973 Mitchell et al.

(List continued on next page.)

*Primary Examiner*—Robert Spitzer
*Attorney, Agent, or Firm*—Cammarata & Grandinetti

[57] ABSTRACT

The disclosed hybrid membrane and pressure swing adsorption process can recover helium from source streams of about 0.5 to 5 percent by volume helium and concentrate the helium to a concentration of greater than about 98 percent by volume. The process comprises a membrane separation followed by two stages of pressure swing adsorption which are used in series. The source gas will primarily contain hydrocarbons but will contain some nitrogen. The membrane unit will contain a semipermeable membrane which is permeably selective for helium and will to the extent feasible reject hydrocarbons. The permeate gas will be increased in helium content by 2 to 10 times. Part of the residue gas is used in the regeneration of the adsorbent beds in the first stage of pressure swing adsorption. Each stage of pressure swing adsorption will contain a plurality of adsorbent beds, and will be cycled through multiple phases. In the first stage the adsorbent beds will sequentially undergo the phases of adsorption, recycle, depressurization, evacuation, helium pressurization and recycle feed pressurization. The product gas from the first stage is flowed to the second stage and in the second stage sequentially will undergo the phases of adsorption, depressurization, evacuation, purge, and helium pressurization. The offgas from the evacuation and purge in the second stage is flowed to input to the first stage. The process efficiently produces a product stream with a helium content of more than 98 percent by volume.

20 Claims, 7 Drawing Sheets

U.S. PATENT DOCUMENTS

| | | | |
|---|---|---|---|
| 3,797,201 | 3/1974 | Tamura | 95/105 |
| 3,838,553 | 10/1974 | Doherty | 95/98 |
| 4,077,780 | 3/1978 | Doshi | 95/100 |
| 4,171,207 | 10/1979 | Sircar | 95/101 |
| 4,444,572 | 4/1984 | Avon et al. | 55/26 |
| 4,529,412 | 7/1985 | Hayashi et al. | 55/25 |
| 4,539,020 | 9/1985 | Sakuraya et al. | 55/26 |
| 4,578,089 | 3/1986 | Richter et al. | 55/26 |
| 4,581,044 | 4/1986 | Uno et al. | 55/25 |
| 4,599,094 | 7/1986 | Werner et al. | 55/26 |
| 4,661,125 | 4/1987 | Haruna et al. | 95/102 |
| 4,666,468 | 5/1987 | Wu | 55/16 |
| 4,675,030 | 6/1987 | Czarnecki | 55/16 |
| 4,687,498 | 8/1987 | Maclean et al. | 62/17 |
| 4,689,062 | 8/1987 | Maclean et al. | 62/18 |
| 4,690,695 | 9/1987 | Doshi | 55/16 |
| 4,701,187 | 10/1987 | Choe et al. | 55/16 |
| 4,705,541 | 11/1987 | Sircar et al. | 55/26 |
| 4,711,645 | 12/1987 | Kumar | 55/26 |
| 4,717,407 | 1/1988 | Choe et al. | 62/18 |
| 4,732,577 | 3/1988 | Koizumi et al. | 95/101 |
| 4,750,925 | 6/1988 | Maclean et al. | 62/18 |
| 4,752,311 | 6/1988 | Maclean et al. | 62/18 |
| 4,765,804 | 8/1988 | Lloyd-Williams et al. | 55/16 |
| 4,770,676 | 9/1988 | Sircar et al. | 55/26 |
| 4,790,858 | 12/1988 | Sircar | 55/26 |
| 4,813,977 | 3/1989 | Kumar et al. | 55/26 |
| 4,813,980 | 3/1989 | Sircar | 55/26 |
| 4,836,833 | 6/1989 | Nicholas et al. | 55/16 |
| 4,861,361 | 8/1989 | Jain et al. | 62/18 |
| 4,863,492 | 9/1989 | Doshi et al. | 55/16 |
| 4,869,894 | 9/1989 | Wang et al. | 95/101 X |
| 4,892,565 | 1/1990 | Kumar et al. | 55/26 |
| 4,913,709 | 4/1990 | Kumar | 55/26 |
| 4,914,218 | 4/1990 | Kumar et al. | 55/26 |
| 4,915,711 | 4/1990 | Kumar | 55/26 |
| 5,004,482 | 4/1991 | Haas et al. | 55/16 |
| 5,006,132 | 4/1991 | Dimartino et al. | 55/16 |
| 5,013,334 | 5/1991 | Maurer | 55/26 |
| 5,026,406 | 6/1991 | Kumar | 55/26 |
| 5,064,446 | 11/1991 | Kusuki et al. | 95/53 |
| 5,080,694 | 1/1992 | Knoblauch et al. | 95/101 X |
| 5,089,048 | 2/1992 | Knoblauch et al. | 95/101 X |
| 5,112,590 | 5/1992 | Krishnamurthy | 95/102 X |
| 5,133,785 | 7/1992 | Kumar et al. | 55/26 |
| 5,156,656 | 10/1992 | Parker et al. | 55/16 |
| 5,171,333 | 12/1992 | Maurer | 55/26 |
| 5,174,796 | 12/1992 | Davis et al. | 55/26 |
| 5,207,806 | 5/1993 | Lagree et al. | 55/16 |
| 5,224,350 | 7/1993 | Mehra | 62/17 |
| 5,226,931 | 7/1993 | Combier | 55/16 |
| 5,232,473 | 8/1993 | Kapoor et al. | 55/26 |
| 5,234,472 | 8/1993 | Krishnamurthy et al. | 95/102 X |
| 5,332,424 | 7/1994 | Rao et al. | 95/47 |
| 5,344,480 | 9/1994 | Schulte et al. | 95/52 |
| 5,354,547 | 10/1994 | Rao et al. | 95/45 X |
| 5,382,280 | 1/1995 | Choe et al. | 95/105 X |
| 5,411,721 | 5/1995 | Doshi et al. | 95/51 X |
| 5,507,856 | 4/1996 | Rao et al. | 95/50 |

OTHER PUBLICATIONS

Recovery and Purification of Light Gases by PSA; Cheng et al ACS Symposium Series #223, Industrial Gas Separations 1983.

The Optimal Control of a Periodic Absorber Aiche Journal, vol. 18, No. 6 Nov. 1972 Kowler et al.

Separation of Nitrogen and Methane Via Periodic Adsorption Aiche Journal, vol. 17, #2, Mar. 1971 Turnock et al.

Separation of Helium–Methane Mixtures by PSA Aiche Journal, vol. 31, #1, Jan. 1985; Cheng et al.

Kinetic Separation by Pressure Swing Adsorption, Method & Model; Aiche Journal, vol. 36 #8, Aug. 1990 Ackley et al.

Separation of Nitrogen From Helium Using PSA; Bird et al, ADV. Cryogenic Engineering, #9 pp. 463–473 (1973).

A New Composite Adsorbent for Methane–Nitrogen Separation by Adsorption; Separation Sciences and Technology No. 257 (7&8) pp. 845–868; 1990 Bakish et al.

C. Tannehill et al.; Nitrogen Removal Costs Vary by Concentration; American Oil & Gas Reporter; May 1994.

R.J. Buras et al; Nitrogen Rejection and Pressure Swing Adsorption; Principles, Design and Remote Control Using an Expert System; Univ. of Oklahoma Conference; Feb. 28, 1994.

STAGE I PHASE SEQUENCES

| TIME<br>ADSORBENT BED | 0 - 120 SECONDS | 120 - 240 SECONDS | 240 - 360 SECONDS | 360 - 480 SECONDS |
|---|---|---|---|---|
| ADSORBENT BED A | ADSORPTION (1) + RECYCLE (2) | DEPRESSURIZATION | EVACUATION | HE PRESSURIZATION (3) + RECYCLE FEED PRESSURIZATION (4) |
| ADSORBENT BED B | HE PRESSURIZATION (3) + RECYCLE FEED PRESSURIZATION (4) | ADSORPTION (1) + RECYCLE (2) | DEPRESSURIZATION | EVACUATION |
| ADSORBENT BED C | EVACUATION | HE PRESSURIZATION (3) + RECYCLE FEED PRESSURIZATION (4) | ADSORPTION (1) + RECYCLE (2) | DEPRESSURIZATION |
| ADSORBENT BED D | DEPRESSURIZATION | EVACUATION | HE PRESSURIZATION (3) + RECYCLE FEED PRESSURIZATION (4) | ADSORPTION (1) + RECYCLE (2) |

(1) ADSORPTION 40 SECONDS.
(2) RECYCLE 80 SECONDS
(3) HELIUM PRESSURIZATION 40 SECONDS
(4) RECYCLE PRESSURIZATION 80 SECONDS (40 SECONDS IF THERE IS FEED PRESSURIZATION)

FIG. 6

STAGE II PHASE SEQUENCES

| TIME / ADSORBENT BED | 0 - 90 SECONDS | 90 - 180 SECONDS | 180 - 270 SECONDS | 270 - 360 SECONDS |
|---|---|---|---|---|
| ADSORBENT BED E | ADSORPTION | DEPRESSURIZATION | EVACUATION + PURGE (1) | HELIUM PRESSURIZATION (2) |
| ADSORBENT BED F | HELIUM PRESSURIZATION (2) | ADSORPTION | DEPRESSURIZATION | EVACUATION + PURGE (1) |
| ADSORBENT BED G | EVACUATION + PURGE (1) | HELIUM PRESSURIZATION (2) | ADSORPTION | DEPRESSURIZATION |
| ADSORBENT BED H | DEPRESSURIZATION | EVACUATION + PURGE (1) | HELIUM PRESSURIZATION (2) | ADSORPTION |

(1) 15 SECONDS PURGE
(2) OPTIONAL 15 SECONDS FEED GAS PRESSURIZATION

FIG. 7

ENHANCED HELIUM RECOVERY

FIELD OF THE INVENTION

This application is a continuation-in-part of U.S. patent application Ser. No. 08/326,917 filed Oct. 21, 1994, now U.S. Pat. No. 5,542,966.

This invention relates to processes for the recovery of helium from a natural gas containing stream. More particularly, this invention relates to a combined membrane separation and pressure swing adsorption system and processes for the recovery of helium from a natural gas containing stream using this membrane separation and pressure swing adsorption system.

BACKGROUND OF THE INVENTION

The principal source of helium is its separation from natural gas streams prior to the natural gas streams being used as a fuel or as a chemical feedstock. Natural gas streams can contain up to about 10 percent helium. It is economically feasible to recover helium from a natural gas stream down to a content of as low as about 0.1 percent.

The economic feasibility depends on both the capital cost for a system and the ongoing operational cost. It is an objective of the present invention to set out a system where the economic efficiency of the system is maximized through the use of a combined membrane and pressure swing adsorption system.

There is disclosed in U.S. Pat. No. 5,542,966 an efficient pressure swing adsorption process for the recovery of helium from natural gas streams. This pressure swing adsorption system will take a typical natural gas which contains from about 1 to 6 percent helium and produce a helium stream which contains more than 99.9 percent helium. This is a very high purity helium. This is done by solely using a pressure swing adsorption system.

One problem in the use of such pressure swing adsorption systems in the recovery of helium from natural gas streams which contain low levels of helium is the volumes of gas that must pass through the adsorbent beds of the pressure swing adsorption system to recover a given volume of helium. In order to accommodate large volumes of helium, the adsorbent containing columns and other equipment must be sized for this gas flow. However, as the volume of gas flow increases, the diameter and/or length of the adsorption columns is increased and the amount of adsorbent needed is likewise increased. It is this capital equipment cost plus the operating cost that will determine if a natural gas stream with a particular helium content can be used as a source of helium.

The efficiency of recovering helium from lower helium content natural gas streams can be increased if there is a membrane partial separation of the helium from the natural gas with a permeate natural gas with an increased helium content being fed to a pressure swing adsorption system. The processes of this application are directed to increasing the helium content of a natural gas stream from about two to ten times the initial concentration up to about 8 to 20 percent helium by volume in a membrane separation stage. When the helium content of the natural gas is doubled, the amount of gas to be flowed through the pressure swing adsorption system to recover the same volume of helium is halved. If tripled, the volume is reduced to one third. And when the helium content is quadrupled the amount of natural gas to be flowed through the pressure swing adsorption system to recover the same volume of helium is reduced to a quarter. This has a significant effect on the capital cost of the pressure swing adsorption system and its operating cost. There is a greater efficiency even though there is a capital cost and an operating cost for the membrane separation system. There is a net cost savings when the helium content in the natural gas stream is increased a given amount.

Using the present pressure swing adsorption system, there is no need to increase the helium content to above about 20 percent by volume. This pressure swing adsorption system can very effectively increase the helium content in this lower range to more than 99.99 percent by volume. This is not feasible with the prior art helium recovery systems.

The efficiency of the pressure swing adsorption system also can be improved. By the use of some of the high pressure residue gas from the membrane unit as the gas to aid in removing primarily nonadsorbed gas from the adsorbent bed that has completed an adsorption phase, the need for an additional compressor in the process is obviated. This results in a savings in the capital cost of the pressure swing adsorption unit.

It is known to separate helium from natural gas by means of pressure swing adsorption. Such a process is disclosed in U.S. Pat. No. 5,089,048. This patent discloses a pressure swing adsorption system for helium enrichment. The process in this patent can be used with helium streams which contain less than 10 percent helium. The process consists of a three step pressure build-up phase, an adsorption phase, a three step pressure relief phase, and an evacuation phase. In the pressure build-up phase, a cocurrent first depressurization gas is flowed cocurrently into an adsorbent bed which has been evacuated to increase the gas pressure in this bed. This is followed by a countercurrent flow of a second cocurrent depressurization gas from another adsorbent bed which has completed an adsorption phase. This is then followed by a countercurrent flow of product gas to bring the bed up to the operating pressure. This process will produce a purified helium stream but at a lower efficiency. One problem is that there is a loss of product helium in the gases that are discharged as waste gases. Since the amounts of helium in the waste gas are relatively high, their loss creates an inefficiency of the process. In the processes of the present invention, helium is maintained in the pressure swing adsorption system as a gas inventory and not removed as part of a waste gas or off-gas. In addition the multi-step pressurization and depressurization techniques are not used in the pressure swing adsorption system.

European Patent 092,695 and U.S. Pat. No. 3,636,679 also disclose pressure swing adsorption systems for helium purification. However, in European Patent 092,695, the feed gas should contain about 50 to 95 percent by volume helium. It is not suitable for gas streams containing less than about 50 percent helium, and is clearly not useful where the helium content of the gas stream is less than about 25 percent helium.

It likewise is known to separate helium from other gases using a combination of membrane separation and pressure swing adsorption separation. However, it is not known to take a helium source having a helium content of less than about 10 percent by volume helium and providing a product that is 99.99 percent by volume helium. In U.S. Pat. No. 4,701,187 the feed to the membrane has a helium concentration of 58.2 mole percent. This is a high feed concentration. In U.S. Pat. No. 4,717,407, there is described a process for the recovery of helium where the feed stream is first treated in a non-membrane unit and then in a membrane unit. The non-membrane unit can be an adsorption unit. This is the reverse of the present process and would require a greater capital cost for the adsorption unit since large gas volumes have to be processed in the adsorption unit. U.S. Pat. No. 5,006,132 discloses a process for upgrading the main product in a pipeline by means of a membrane process. The main product permeates through the membrane with contaminants rejected. The rejected gas is put back into the pipeline and the product gas is used. Helium can be one of the rejected gases. U.S. Pat. No. 5,224,350 discloses a process for recovering helium from a hydrocarbon/nitrogen stream by first removing the hydrocarbons in a liquid extraction followed by a nitrogen/helium separation in a membrane unit. The helium from the membrane unit that is in a concentration of more than 50 mole percent can be flowed to a pressure swing adsorption unit to increase the helium content to more than 99 mole percent. None of these processes is a highly efficient process. In the present system and processes, there is no need for a membrane unit to increase the helium content of a feed gas to 50 mole percent or more. The present membrane and pressure swing adsorption system and processes have a high efficiency at a feed to the pressure swing adsorption unit from the membrane unit of about 10 to 20 volume percent helium.

BRIEF SUMMARY OF THE INVENTION

It is an object of this invention to provide a process for helium recovery which utilizes at least one stage of membrane enrichment followed by at least two stages of pressure swing adsorption. The membrane enrichment will increase the helium concentration of from about two to ten times the initial helium concentration with the pressure swing adsorption stages increasing the helium concentration to 98 percent by volume or more. The source of the helium containing stream can be a gas stream exiting a natural gas well, a natural gas pipeline or any other gaseous source containing helium.

When the gas source is a pipeline, or a wellhead gas that is to be flowed into a pipeline, a non-permeate residue gas from the membrane stage is compressed to pipeline pressure and put into the pipeline. In this way there is a minimal loss of natural gas in the pipeline or of the natural gas being flowed to the pipeline. The off-gas from the first pressure swing stage can be used to power compressors or is flared.

As a preferred embodiment, some residue gas from the membrane unit is fed to the stage I pressure swing adsorption process. This gas is used in phase II to flow a gas having an essentially feed gas composition from the adsorbent bed that is undergoing phase II processing in place of pressurizing a depressurization gas from phase III and using this pressurized gas for this purpose. There then is produced a recycle feed gas from phase II that is used in phase VI to repressurize an adsorbent bed that is to go back onto a phase I adsorption step. By the use of residue gas to produce the recycle feed gas a compressor is not needed to pressurize part of the depressurization gas from phase III for use in phase II to produce the recycle feed gas.

Essentially any membrane that is permeation selective for helium versus nitrogen, methane, carbon dioxide and hydrocarbons can be used. The feed pressure to the membrane module will be in the range of about 400 to 1200 psig. The helium enriched gas that permeates through the membrane will be at about 65 to 100 psia pressure, or at a lower pressure if a vacuum is drawn on the permeate side of the membrane. If more than one stage of membrane separation is used this permeate will be pressurized to about 400 to 1200 psig and fed to the second stage. After the membrane enrichment of the gas stream the permeate gas as needed is pressurized to about 25 to 100 psia and fed to one or more stages of pressure swing adsorption to increase the concentration of helium. In order to increase the helium concentration to 98 percent by volume or more, it is preferred to use two stages of pressure swing adsorption.

Although each stage of pressure swing adsorption also can be used alone without the other stage, it is the preferred embodiment to use two stages of pressure swing adsorption. Only the first stage of pressure swing adsorption can be used where a helium gas in a purity of 75 to 95 percent by volume will be sufficient. Such a purity is sufficient for party balloons and advertising balloons. The second stage of pressure swing adsorption can be used alone where the helium gas has been concentrated to about 50 to 90 percent by volume using a membrane or cryogenic technique but then must be increased to a purity of 98 percent by volume or more. This second stage of pressure swing adsorption is very efficient in producing high purity helium gas streams.

The first pressure swing adsorption stage is comprised of a plurality of adsorbent beds with each adsorbent bed sequentially undergoing six pressure swing adsorption phases. These are:

I—Adsorption
II—Recycle
III—Depressurization
IV—Evacuation
V—Helium Pressurization
VI—Feed Recycle Pressurization The second pressure swing adsorption stage is comprised of a plurality of adsorbent beds with each adsorbent bed undergoing five phases. These are:

I—Adsorption
II—Depressurization
III—Evacuation
IV—Purge
V—Helium Pressurization In the first stage pressure swing adsorption system the adsorbent bed enters a phase I adsorption phase and produces a crude helium product. Following the adsorption phase the adsorbent bed is regenerated. In regeneration the adsorbent bed first enters a phase II recycle phase where a recycle feed gas is produced. This is produced by feeding a part of the residue gas from the membrane unit to this adsorbent bed. The recycle feed gas that is produced as it exits the adsorbent bed which has just completed an adsorption phase is flowed to an adsorbent bed about to go onto a phase I adsorption phase. In the phase II recycle phase the residue gas flows through the adsorbent bed pushing the gas in the void space (which has approximately feed composition) to the exit of the bed. The phase III depressurization comprises countercurrently reducing the pressure in the adsorbent bed and recovering a depressurization gas that is combined with the Phase IV evacuation phase gas, compressed for use as energy to power plant equipment, or to the flare unit. At this point, the adsorbent bed undergoing phase III depressurization is at about ambient pressure and undergoes a phase IV evacuation phase to remove essentially all of the adsorbed components. The adsorbent bed on phase IV evacuation is lowered in pressure to less than ambient pressure to countercurrently remove the adsorbed substances from the adsorbent bed. This gas is recovered and compressed with the gas from phase III as described above. This gas primarily will be hydrocarbons and nitrogen. The adsorbent bed then undergoes a phase V helium pressurization where an enriched helium gas from phase I adsorption is flowed countercurrently into the adsorbent bed. In a final phase the adsorbent undergoes a phase VI recycle feed pressurization where recycle feed gas from phase II recycle is fed cocurrently into the adsorbent bed. The adsorbent bed then is at about input gas pressure and is in a condition for a phase I adsorption.

The crude helium from the first pressure swing adsorption stage is fed to the second pressure swing adsorption stage. In the second pressure swing adsorption stage the adsorbent bed on phase I adsorption receives the enriched helium product from the first pressure swing adsorption phase. Upon the completion of the phase I adsorption phase, the adsorbent bed undergoes a phase II depressurization phase. This consists of countercurrently reducing the pressure in the adsorbent bed to about ambient pressure. All of the depressurization gas produced in the depressurization phase is compressed and flowed to the adsorbent bed on an adsorption phase. Upon the completion of the phase II depressurization phase, the adsorbent bed then undergoes a phase III evacuation phase. This consists of reducing the pressure to less than ambient pressure. The off-gas from this phase can be collected and in whole or in part flowed to the feed of the first pressure swing adsorption stage or fed to the input to the membrane separation unit. It will be primarily nitrogen and some helium. Prior to completion of the evacuation phase, the adsorbent bed is purged with an amount of helium product from this second pressure swing adsorption stage. This consists of flowing some of the product helium gas countercurrently into the adsorbent bed. This removes traces of non-helium gases from the adsorbent bed and void space. The adsorbent bed then undergoes helium pressurization phase V which consists of flowing product helium gas countercurrently into the adsorbent bed. At this point the adsorbent bed has been regenerated and is ready for another adsorption phase.

Each pressure swing adsorption system is comprised of a plurality of adsorbent beds. Usually there are about three to five adsorbent beds in each pressure swing adsorption stage and preferably about four. Each adsorbent bed in each stage sequentially will undergo the noted phases. The number of adsorbent beds used will be an economic balance between the capital cost of the installation and operating costs. The timing of the phase in each stage will to a degree be dependent on the composition of the feed streams., the feed stream flow rates and the size of the adsorbent beds.

BRIEF DESCRIPTION OF THE DRAWINGS

FIG. 6 is a table which sets out the phase sequences by time for the first stage pressure swing adsorption system.

FIG. 7 is a table which sets out the phase sequences by time for the second stage pressure swing adsorption system.

DETAILED DESCRIPTION OF THE INVENTION

Figure 1:
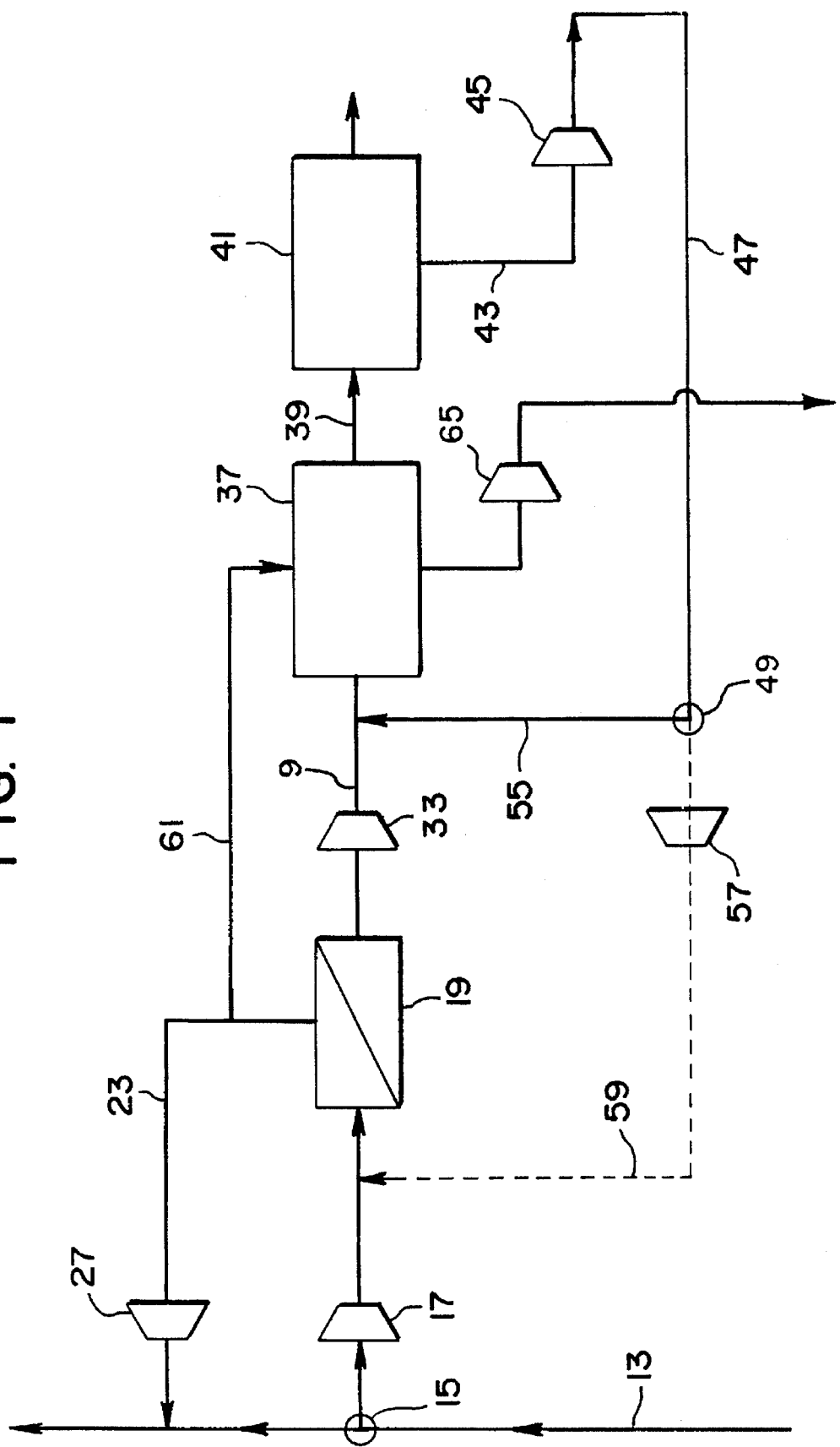
FIG. 1 is a schematic diagram of a hybrid membrane and pressure swing adsorption system for helium recovery.

The present processes will be described in more detail with reference to the figures. The processes preferably consist of at least one membrane separation stage and at least two stages of pressure swing adsorption. A feed gas is derived from a wellhead gas or from a natural gas pipeline. This gas will be at a pressure of about 25 psia to 1200 psia. This feed gas is fed to the membrane stage of the process at a pressure of about 400 to 1200 psia. The membrane stage produces a permeate stream and a non-permeate residue stream. The residue stream which is almost 100 percent non-helium containing gas is pressurized and fed back to the gas source while the permeate stream, depending on its pressure, will be used at permeate pressure or pressurized to about 25 to 100 psia and fed to the first stage of pressure swing adsorption. In the first stage, a gas stream which contains up to about 20 percent by volume helium is enriched in helium to more than about 50 percent by volume, and preferably to more than about 90 percent by volume helium. This is accomplished by preferentially adsorbing the other gases that are present along with the helium and removing the other gases. Then in a second stage of pressure swing adsorption, depending on the helium content of the feed gas, the helium content of the gas stream is increased to more than 95 percent by volume, and preferably to more than about 99 percent. At this concentration the helium is commercially usable.

A primary source of helium is from natural gas. This can be from the natural gas at the wellhead or from a natural gas in a pipeline. The present combined membrane and pressure swing adsorption system is economic to operate to recover helium present at low concentrations. The membrane separation will increase the concentration of the helium and decrease the volume of the other gases that must be removed to recover the helium. This makes it economically viable to recover helium from gas streams having a low helium content.

The membrane section of the system can be any membrane device with some selectivity for helium over nitrogen, carbon dioxide, methane and higher hydrocarbons. Each membrane section may consist of a single membrane device, or in the alternative, several membrane modules interconnected and operated in order to most efficiently produce a final permeate stream with a maximum helium content. Each of the modules would contain a semipermeable membrane selective for the particular separation. Suitable semipermeable membranes include polysulfone, cellulose acetate, polyimide, polyamide, silicone rubber and polyphenylene oxide membranes. These membranes will increase the content of the helium in the gas stream from two to ten times. These membranes preferably will be in the form of tubes having a very small diameter. This provides for a high gas/membrane contact and a selective permeation of the helium through the membrane. The initial helium content of the feed gas will be about 0.5 to 5 percent by volume helium, visually about 0.5 to 2 percent by volume helium.

Each of the pressure swing adsorption systems uses an adsorbent which has no affinity for helium. Essentially any adsorbent that has an affinity for nitrogen and hydrocarbons can be used. The preferred adsorbents are activated carbons. Aluminosilicate and silica gel adsorbents can also be used.

In FIG. 1, there is shown a combined membrane and pressure swing adsorption system that gets a feed gas from conduit 13 via interconnect 15. This conduit 13 can be a gas pipeline, such as an interstate gas pipeline, or a feed from a wellhead. Compressor 17 will boost the pressure to about 400 to 1200 psia with this gas being fed into membrane separation section 19. This compressor is not needed where the gas is at a pressure of greater than about 400 psia. In this membrane separation unit is a semipermeable membrane highly selective for helium with a low permeability for the other components of the gas stream. The residue gas exits at conduit 23 and is boosted in pressure by compressor 27 prior to being fed back into pipeline 13. Preferably, some of this residue gas is flowed to the pressure swing adsorption units through conduit 61. The permeate gas which is at a pressure of about 65 to 100 psia or lower flows to compressor 33 where it is increased in pressure to about 25 to 100 psia as is needed and fed into the first stage of pressure swing adsorption 37. The gas is further enriched in helium and flows by conduit 39 to a second stage of pressure swing adsorption 41. There is produced a product gas which is more than 98 percent by volume helium and a by-product gas that is rich in the other components, primarily nitrogen is fed, in whole or in part, back to any of the feed to the first stage of pressure swing adsorption or to the feed to the membrane separation unit. This gas flows through conduit 43 to compressor 45 where it is boosted in pressure. Valve 49 which is in line 47 is a three way valve. This valve will direct the flow of gas to conduit 55 and the first stage of pressure swing adsorption, or to compressor 57 and through line 59 to the input to the membrane separation stage. The non-helium containing gas from the first stage of pressure swing adsorption will be flowed through compressor 65 and conduit 63 for use in providing power to the plant or flared. The membrane unit will be comprised of a section containing from 10 to 30 tubes of a polymer selective for helium. These tubes will be about 8 to 16 in diameter and 3 to 6 ft. in length. The pressure drop across the membrane unit is about 5 psia. The membrane unit processes a gas flow of about 350 to 3500 scfm. The output gas will have a helium content of about 4 to 20 percent by volume helium.

Figure 2:
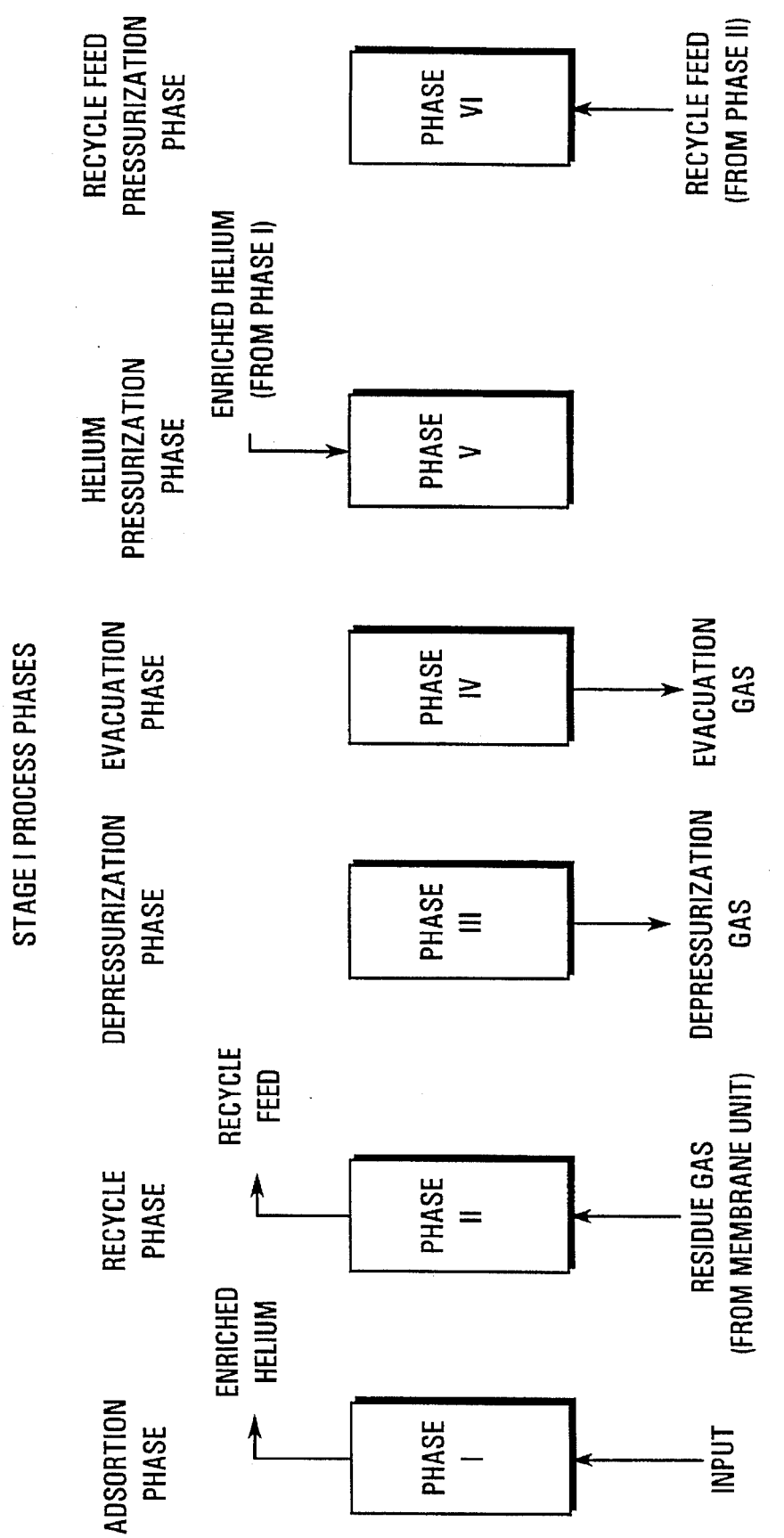
FIG. 2 is a schematic diagram of the pressure swing adsorption phases of the first stage of the pressure adsorption system section of the helium recovery process.

The first pressure swing adsorption stage consists of six phases which are set out diagramatically in FIG. 2. In phase I, adsorption, an input gas stream is fed to the adsorbent bed. An enriched helium gas flows from this adsorbent bed with substantial quantities of the other gases being adsorbed in the adsorbent bed. A portion of the enriched helium is used in phase V helium pressurization. After the adsorbent bed that is undergoing adsorption has become saturated with adsorbed other gases, it enters recycle phase. This consists of flowing a residue gas from the membrane unit to this adsorbent bed on phase II recycle. This residue gas removes helium and feed gas that is in the void space in the adsorbent bed to produce a recycle feed gas. The recycle feed gas with the helium from the void space flows from this adsorbent bed and is fed to the adsorbent bed that is on a phase VI recycle feed pressurization phase. This recycle feed gas may be supplemented with feed gas, i.e. permeate gas from the membrane unit.

Concurrently an adsorbent bed is undergoing a phase III depressurization phase. The phase III depressurization phase consists of decreasing the pressure in an adsorbent bed to about ambient pressure. The effluent gases which are hydrocarbons and nitrogen contain little or no helium and may have a high fuel value. They usually are used to power plant equipment or are flared. At the same time another adsorbent bed is undergoing a phase IV evacuation phase. The phase IV evacuation consists of drawing a vacuum on the adsorbent bed and countercurrently removing substantially all of the adsorbed gases from the adsorbent bed. These gases, like the phase III depressurization gas, usually are recompressed and fed back to the pipeline or other source. If not fed back to the pipeline or other source, they are used as a fuel in the plant or flared.

Simultaneously another adsorbent bed is undergoing a helium pressurization phase. In this phase enriched helium product from phase I adsorption is flowed into the adsorbent bed, preferably countercurrently. Immediately upon the completion of helium pressurization the adsorbent bed is further pressurized with recycle feed gas from phase II recycle and feed gas. Preferably this gas is flowed cocurrently into the adsorbent bed. This adsorbent bed then will be at about the pressure of the input gas.

The enriched helium gas from phase I that is not used in the stage I pressure swing adsorption process is flowed to the second stage pressure swing adsorption process for additional enriching. The second stage pressure swing adsorption process is described in FIG. 3 This is a five phase process and is different from the first stage pressure swing adsorption process. The first phase of the second stage process is an adsorption phase and consists of passing the enriched helium gas from stage I into the adsorbent bed undergoing a second stage adsorption phase. A further enriched helium gas flows from the adsorbent bed on phase I adsorption with the non-helium other gases being adsorbed. A portion of this enriched helium is used in the phase IV purge phase to countercurrently flow and purge the other gases from the void space and the adsorbent in the bed undergoing this phase. Another portion of the enriched helium is flowed to phase V helium pressurization. The adsorbent bed undergoing phase V pressurization is pressurized prior to undergoing a phase I adsorption phase.

Concurrently, there is an adsorbent bed undergoing a phase II depressurization. This consists of countercurrently depressurizing the adsorbent bed which has completed the phase I adsorption phase to produce a recycle gas. The recycle gas from this phase II depressurization is pressurized to about the feed gas pressure or higher and flowed along with feed gas into the adsorbent bed on phase I adsorption.

At the same time, an adsorbent bed is undergoing a phase III evacuation. This consists of reducing the pressure from ambient to more than 20 inches of Hg vacuum, and preferably to more than about 28 inches of Hg vacuum. This removes substantially all of the non-helium other gases from the adsorbent bed. This gas from the evacuation phase is usually recycled to stage I input gas since it can contain up to 50 percent or more by volume helium.

These are the pressure swing adsorption phases that are used in stage I and in stage II. Each adsorbent bed undergoing the pressure swing adsorption process in each stage sequentially goes through the respective phases for stage I and for stage II. The timing for the phases in each stage varies with the composition of the input gas stream, gas flow rates and the size of the adsorbent beds. The timing will be governed also by the time that it takes an adsorbent bed on an adsorption phase to reach breakthrough. The input to the adsorbent bed on an adsorption phase will cease just prior to the adsorbed gases exiting (breaking through) the end of the adsorbent bed. This then will govern the timing of the other phases.

The stage I process will be described with particular reference to FIG. 4. The input gas stream is fed through conduit 10 and valve 12 into conduit 14 which delivers the input gas stream to the adsorbent beds. Since adsorbent bed A is on an adsorption phase inlet valve 32 is open as is exit valve 38. Valves 30, 34 and 36 are closed as are inlet valves 44, 56 and 68 for the other adsorbent beds. Valve 24 also is dosed. An enriched helium product exits adsorbent bed A and flows through conduits 21 and 67 to stage II. Throttle valve 28 controls the pressure in conduits 21 and 67 and enriched helium storage tank 26 which stores some of the enriched helium product from this stage I. One way valve 53 allows for a flow of gas from conduit 21 to conduit 67. The stored enriched helium gas is used in stage I.

Upon the completion of the adsorption phase adsorption bed A enters a recycle phase. In the recycle phase, part of the residue gas from the membrane unit (fed through conduit 29) and residue gas from storage tank 25 is fed to adsorbent bed A from conduit 22. During this time valve 32 is closed and valve 30 is opened. On the exit end of adsorbent bed A valve 38 is closed and valve 40 is open. A recycle feed gas flows from adsorbent bed A through conduit 20 to storage tank 16 during this phase. This recycle feed gas will be used to pressurize adsorbent bed B which concurrently is undergoing a phase VI recycle feed pressurization. In order to flow this gas to adsorbent bed B valve 12 is dosed and valve 24 opened. Input valves 32, 68 and 56 on the other adsorbent beds are closed and valve 44 opened. The residue gas during the recycle phase removes a helium gas having a content of about the input gas from the void space in adsorbent bed A.

While adsorbent bed A is on an adsorption phase and a recycle phase, adsorbent bed D has been on a phase III depressurization phase. In this phase, outlet valves 74 and 76 are closed as are inlet valves 66, 68 and 72. Depressurization gas flows from adsorbent bed D through valve 70 and into conduits 18 and 31. This depressurization gas can exit through valve 78 be used as a fuel in the plant or flared or be pressurized by compressor 69 and used in the process.

While adsorbent bed A is on an adsorption phase and a recycle phase, and adsorbent bed D on a depressurization phase, adsorbent bed C is on a phase IV evacuation phase. In this phase outlet valves 62 and 64 and inlet valves 54, 56 and 58 of adsorbent bed C are closed. Valve 60 is opened. Evacuation gas, which is substantially the more highly adsorbed non-helium gases, flows through conduit 11 and vacuum pump 35 and is flowed for further use. Upon the completion of the evacuation phase, adsorbent bed C is substantially clean of the non-helium more highly adsorbed gases.

Concurrently with these operations, adsorbent bed B has been on repressurization. The first part of repressurization consists of the phase V helium pressurization phase. In this phase, all of the inlet valves to adsorbent bed B, valves 42, 44, 46 and 48, are closed. Outlet valve 52 also is closed. However, outlet valve 50 is opened so that enriched helium gas will flow countercurrently into adsorbent bed B. Upon the completion of helium pressurization, valve 50 is closed and inlet valve 44 is opened. At this time inlet valve 12 is closed and recycle valve 24 is opened. This allows a recycle feed gas to flow into adsorbent bed B through conduit 14 from storage tank 16. This will repressurize adsorbent bed B to about the input feed gas pressure.

A preferred option is to incorporate a short input gas repressurization just prior to the adsorption phase. In this mode up to about half of the recycle feed repressurization time is transferred to an input gas repressurization time. In this preferred option it only is required that valve 24 be closed and valve 12 opened. Since adsorbent bed B will be entering an adsorption phase in the next sequence, this will remain the position of these valves. During an input gas pressurization of adsorbent bed B outlet valves 50 and 52 remain closed. When adsorbent bed B enters the adsorption phase it then will be necessary only to open valve 50.

This describes a full sequence of the operation of the stage I pressure swing adsorption system. This produces an enriched helium which contains more than about 75 volume percent helium, and preferably more than about 90 volume percent helium. The adsorbent beds then sequentially go through the phase sequences as set out in FIG. 6. A useful timing for a full cycle is 480 seconds. However, timing is dependent on input gas stream composition, pressure and flow rates as well as adsorbent bed size. If a feed pressurization step is used in the repressurization of the adsorbent beds this usually will be for a period of about 40 seconds. This timing is for adsorbent beds which contain about 18,000 pounds of adsorbent, a feed gas pressure of about 50 psia and a flow rate of about 1000 to 3000 cubic feet per minute, and preferably about 2000 cubic feet per minute. Table 1 gives the valve position versus time during a cycle of the stage I pressure swing adsorption system. The full operation of the stage I process is fully described with reference to FIG. 2, FIG. 4, FIG. 6 and Table 1.

TABLE 1

| Valve # | 0–120 sec. | 120–240 sec. | 240–360 sec. | 360–480 sec. |
|---|---|---|---|---|
| 12 | O/C(1) | O/C(1) | O/C(1) | O/C(1) |
| 24 | C/O(2) | C/O(2) | C/O(2) | C/O(2) |
| 30 | C/O(4) | C | C | C |
| 32 | O/C(3) | C | C | C/O(5) |
| 34 | C | O | C | C |
| 36 | C | C | O | C |
| 38 | O/C(3) | C | C | O/C(6) |
| 40 | C/O(4) | C | C | C |
| 42 | C | C/O(4) | C | C |
| 44 | C/O(5) | O/C(3) | C | C |
| 46 | C | C | O | C |
| 48 | C | C | C | O |
| 50 | O/C(6) | O/C(3) | C | C |
| 52 | C | C/O(4) | C | C |
| 54 | C | C | C/O(4) | C |
| 56 | C | C/O(5) | O/C(3) | C |
| 58 | C | C | C | O |
| 60 | O | C | C | C |
| 62 | C | O/C(6) | O/C(3) | C |
| 64 | C | C | C/O(4) | C |
| 66 | C | C | C | C/O(4) |
| 68 | C | C | C/O(5) | O/C(3) |
| 70 | O | C | C | C |
| 72 | C | O | C | C |
| 74 | C | C | O/C(6) | O/C(3) |
| 76 | C | C | C | C/O(4) |
| 78 | C/O(7) | C/O(7) | C/O(7) | C/O(7) |

(1) Open during adsorption and closed during recycle feed pressurization
(2) Closed during adsorption and open during recycle feed pressurization
(3) Open during adsorption and closed during recycle
(4) Closed during adsorption and open during recycle
(5) Closed during helium pressurization and open during recycle feed pressurization
(6) Open during helium pressurization and closed during recycle feed pressurization
(7) Closed during the first part of depressurization.

Figure 5:
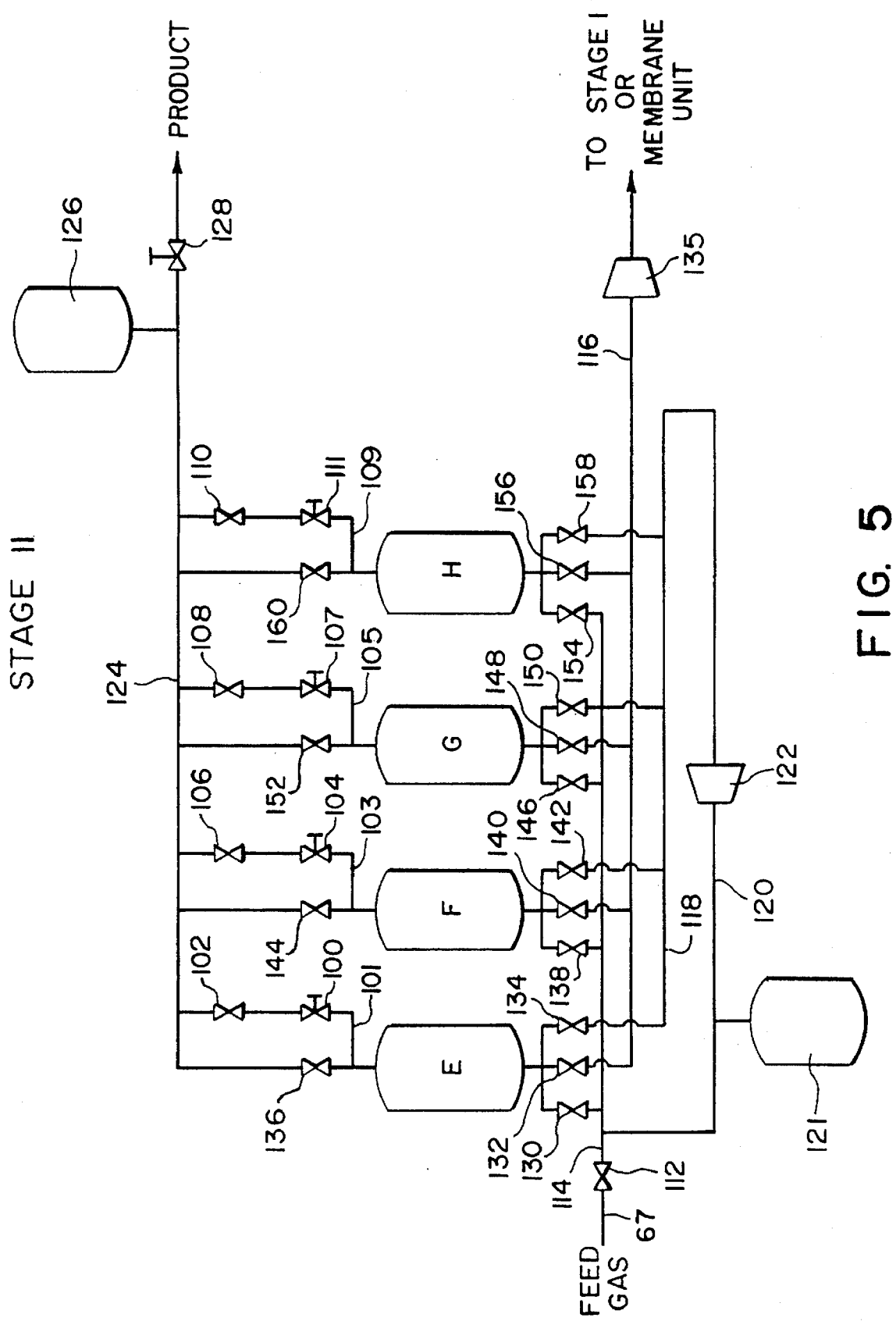
FIG. 5 is a detailed schematic diagram of the second stage pressure swing adsorption system.

The helium enriched gas from stage I is fed as the feed gas to the stage II pressure swing adsorption system as shown in FIG. 5. This feed gas flows from conduit 23 of stage I through valve 112 and into conduit 114. With adsorbent bed E on a phase I adsorption phase, outlet valve 136 is open as is inlet valve 130. Valve 102 is dosed. Valves 132 and 134 of adsorbent bed E are closed, as are inlet valves 138, 146 and 154 to adsorbent beds F, G and H respectively. The feed gas flows into adsorbent bed E as also does a recycle gas from adsorbent bed H which is on a phase II depressurization phase. Optionally some of the recycle gas can be stored in tank 121. This depressurization phase recycle gas flows through conduit 118 to compressor 122 where its pressure is increased up to about that of the feed gas or higher. A purified helium product flows through valve 136 and through conduit 124 to a product outlet with some purified helium held in storage tank 126. Throttle valve 128 regulates the pressure in conduit 124 and tank 126. Part of this purified helium will be used in the purge phase and in the phase V helium pressurization phase. The remainder is product gas.

While adsorbent bed E has been on a phase I adsorption phase, adsorbent bed H has been on a phase II depressurization phase. In this phase, outlet valves 160 and 110 are closed, as are inlet valves 154 and 156. The depressurization recycle gas flows through valve 158 and conduit 118 to compressor 122. Pressurized to about feed gas pressure or higher, the recycle gas flows through conduit 120 to conduit 114. In this part of the sequence, this recycle gas will be fed to adsorbent bed E.

Concurrently adsorbent bed G is on a phase III evacuation phase and a phase IV purge phase. In the evacuation phase outlet valves 152 and 108 are closed as are inlet valves 146 and 150. A vacuum is drawn on conduit 116 by vacuum pump 135. This decreases the pressure in adsorbent bed G to more than about 20 inches of Hg vacuum and preferably to more than about 28 inches of Hg vacuum, which substantially removes all of the more highly adsorbed gases from this adsorbent bed G. For the phase IV helium purge phase which takes place at the end of the evacuation phase, valve 108 is opened to allow purified helium to enter adsorbent bed G and to flow countercurrently down into adsorbent bed G. Valve 148 remains open and adsorbent bed G is under a vacuum. This serves to remove the more highly adsorbed gases from the void space and the adsorbent in adsorbent bed G. The gases flowing from adsorbent bed G are compressed in compressor 45 and flowed to the input to stage I through conduits 47 and 55 as a part of the stage I input gas or to the feed to the membrane unit through conduits 47 and 59. If flowed to the membrane unit it will be compressed to the membrane unit pressure by compressor 57.

Additionally concurrently adsorbent bed F has been in repressurization. This first consists of a phase V helium pressurization phase. In this phase inlet valves 138, 140 and 142 are closed. Outlet valve 144 is open so that purified helium gas which is at a pressure about that of the feed gas flows countercurrently into adsorbent bed F to increase the pressure of adsorbent bed F to about that of the feed gas. Valve 106 is closed.

A preferred option is to also incorporate a feed gas pressurization into the sequence. This entails the closing of valve 106 about half to three fourths of the time through the helium pressurization phase, and preferably about two thirds of the time, and opening valve 138. This permits a repressurization to full feed gas pressure by the use of feed gas prior to valve 144 being opened and an adsorption phase initiated. When this adsorbent bed enters an adsorption phase it only will be necessary to open valve 144.

Valves 100, 104, 107 and 111 are throttle valves which are open through all phase sequences. These valves are interconnected to line 124 and the adsorbent bed exits via conduits 101, 103, 105 and 109 respectively. The flow of helium gas as a purge gas is controlled by the respective companion valve to each of these throttle valves.

This completes an operating sequence for the stage II pressure swing system. Each of the adsorbent beds sequentially goes through each of the phases. This sequence versus time is set out in FIG. 7. This is shown for a 360 second cycle which is a preferred timing. However, as with stage I, the timing is dependent on feed gas composition, feed gas pressure and flow rate and on the adsorbent bed size. In this stage each adsorbent bed contains about 1600 pounds of adsorbent.

Figure 3:
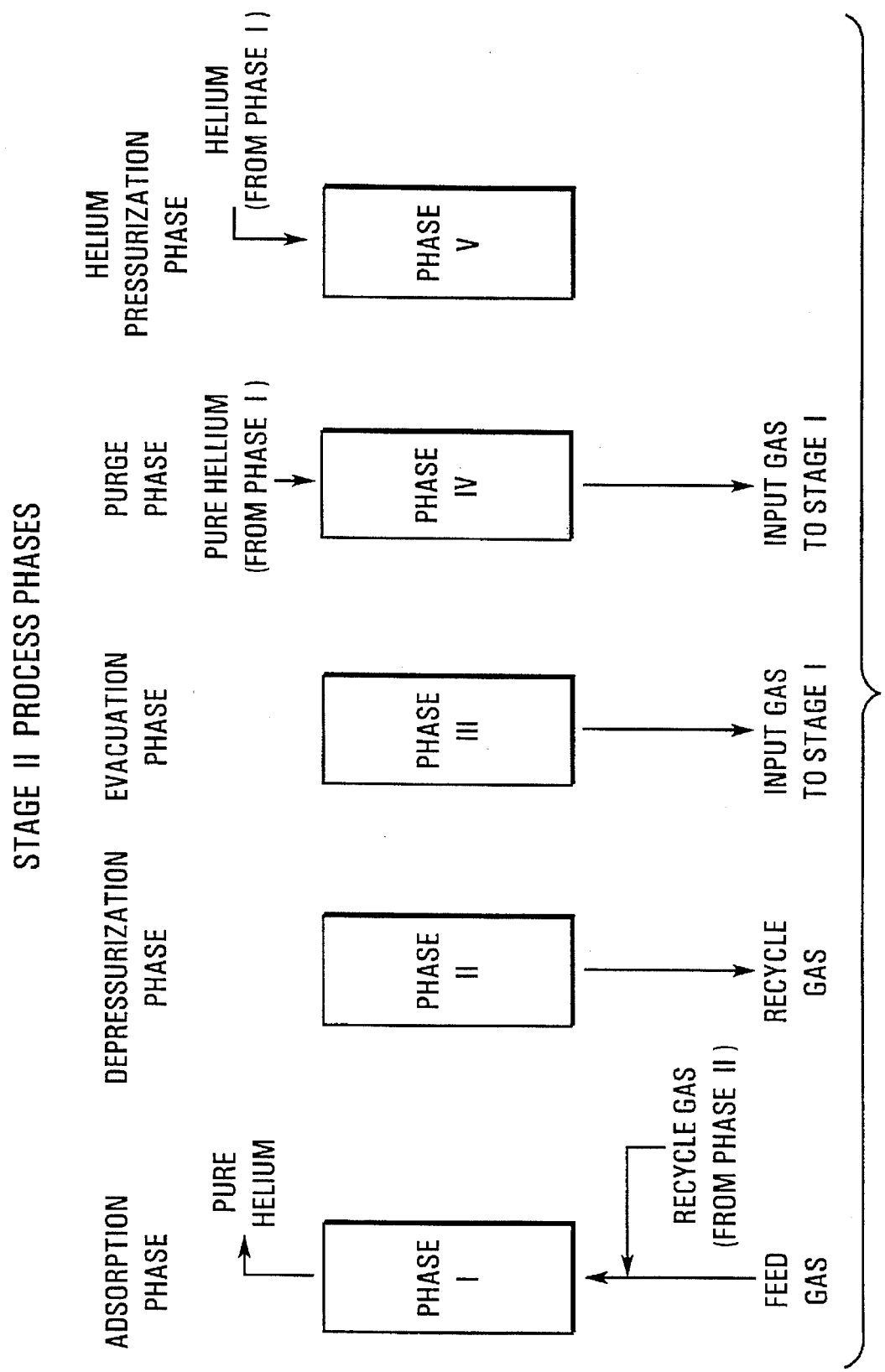
FIG. 3 is a schematic diagram of the pressure swing adsorption phases of the second stage of the pressure swing adsorption section of the helium recovery process.

Table 2 describes the position of each valve during a cycle of FIG. 7 using the pressure swing adsorption system of FIG. 5 and the phase sequence of FIG. 3.

TABLE 2

| Valve # | 0–90 sec. | 90–180 sec. | 180–270 sec. | 370–460 sec. |
|---|---|---|---|---|
| 102 | C | C | C/O(1) | C |
| 106 | C | C | C | C/O(1) |
| 108 | C/O(1) | C | C | C |
| 110 | C | C/O(1) | C | C |
| 130 | O | C | C | C/O(2) |
| 132 | C | C | O | C |
| 134 | C | O | C | C |
| 136 | O | C | C | O/C(3) |
| 138 | C/O(2) | O | C | C |
| 140 | C | C | C | O |
| 142 | C | C | O | C |
| 144 | O/C(3) | O | C | C |
| 146 | C | C/O(2) | O | C |
| 148 | O | C | C | C |
| 150 | C | C | C | O |
| 152 | C | O/C(3) | O | C |
| 154 | C | C | C/O(2) | O |
| 156 | C | O | C | C |
| 158 | O | C | C | C |
| 160 | C | C | O/C(3) | O |

(1) Closed during evacuation and open during purge
(2) Closed during helium pressurization and open during an optional feed gas pressurization of 15 seconds
(3) Open during helium pressurization and closed during an optional feed gas pressurization This valve position sequence is for a preferred operation of the present process as is the phase and cycle timing. The valve position sequence and the phase and cycle timing can be modified and yet remain within the scope of the present processes.

The two position valves that are used are valves which are either open or closed usually are butterfly valves. Valves 28 and 128 are throttle valves that remain open in a constricted condition.

The combined stage I and stage II pressure swing systems will produce a helium gas product of more than about 90 percent by volume helium, and preferably more than about 98 percent by volume helium. The pressure swing system can be fully automated with a central processor controlling all of the flows and valve sequencing. The valves are rated for the pressures of the systems. The tanks and conduits likewise must be rated for the operating pressures.

This description sets out the preferred operation of the stage I and stage II pressure swing systems to produce a highly enriched product. The full scope of the invention is more particularly set out and described in the appended claims.

As noted above the first stage of pressure swing adsorption or the second stage of pressure swing adsorption can be used alone; however, it is preferred that they be used together in tandem as described. The first stage will produce a helium product stream of about 75 to 90 percent by volume helium from a gas stream of less than about 20 percent by volume. Such a helium product can be used in balloons and dirigibles. The second stage of pressure swing adsorption will bring this helium stream up to a helium content of 98 percent by volume or more.

A factor in the increased efficiency of the present pressure swing adsorption processes is the inventory of gas that is maintained within each of pressure swing adsorption stage. The only gases that are discharged from stage I is the product enriched helium gas and the adsorbed gases which primarily are hydrocarbons and nitrogen. These will contain trace amounts at most of helium. In stage I the only non-product gas that leaves the system is the gas from the evacuation phase which is only adsorbed gases and has essentially no helium content and the depressurization gas that has essentially no helium content. The effluent gas from the recycle phase flows to a recycle feed pressurization phase. The gas in the first stage of pressure swing adsorption functions as an inventory gas until it is essentially devoid of helium and then is vented or flared.

The second stage of pressure swing adsorption likewise maintains a high inventory of gas. When used in combination with the first stage of pressure swing adsorption the gas from the evacuation phase and from the helium purge phase is flowed to the input gas to stage I pressure swing adsorption. In this way no helium leaves the system. A high inventory of gas is maintained in stage II through the flow of all of the depressurization gas into the adsorbent bed in an adsorption phase.

The preferred embodiments of the present helium enrichment processes have been disclosed in this specification. However various modifications can be made to the processes and yet comprise the present concepts. Such modifications are considered to be within the present discoveries.

EXAMPLE

An input gas containing 1.6 percent helium by volume, 26 percent hydrocarbons by volume and 72.4 percent nitrogen by volume is flowed to membrane unit 19 at a pressure of 925 psig and 5250 scfm. The permeate stream which contains 4 percent by volume helium exits at 65 psia and flows through conduit 9 to the first stage pressure swing adsorption 37. Since the permeate stream is already at a pressure of 65 psia, compressor 33 is not needed. The residue stream exits the membrane unit at 920 psia through conduit 23, is compressed by compressor 27 to the source pressure and flowed back to the source. This residue stream will contain less than 0.05 percent helium.

The membrane unit consists of 16 modules containing a polyimide. The polyimide membrane is in the form of hollow fibers. Each module is 10 inches in diameter and 4 feet in length.

Figure 4:
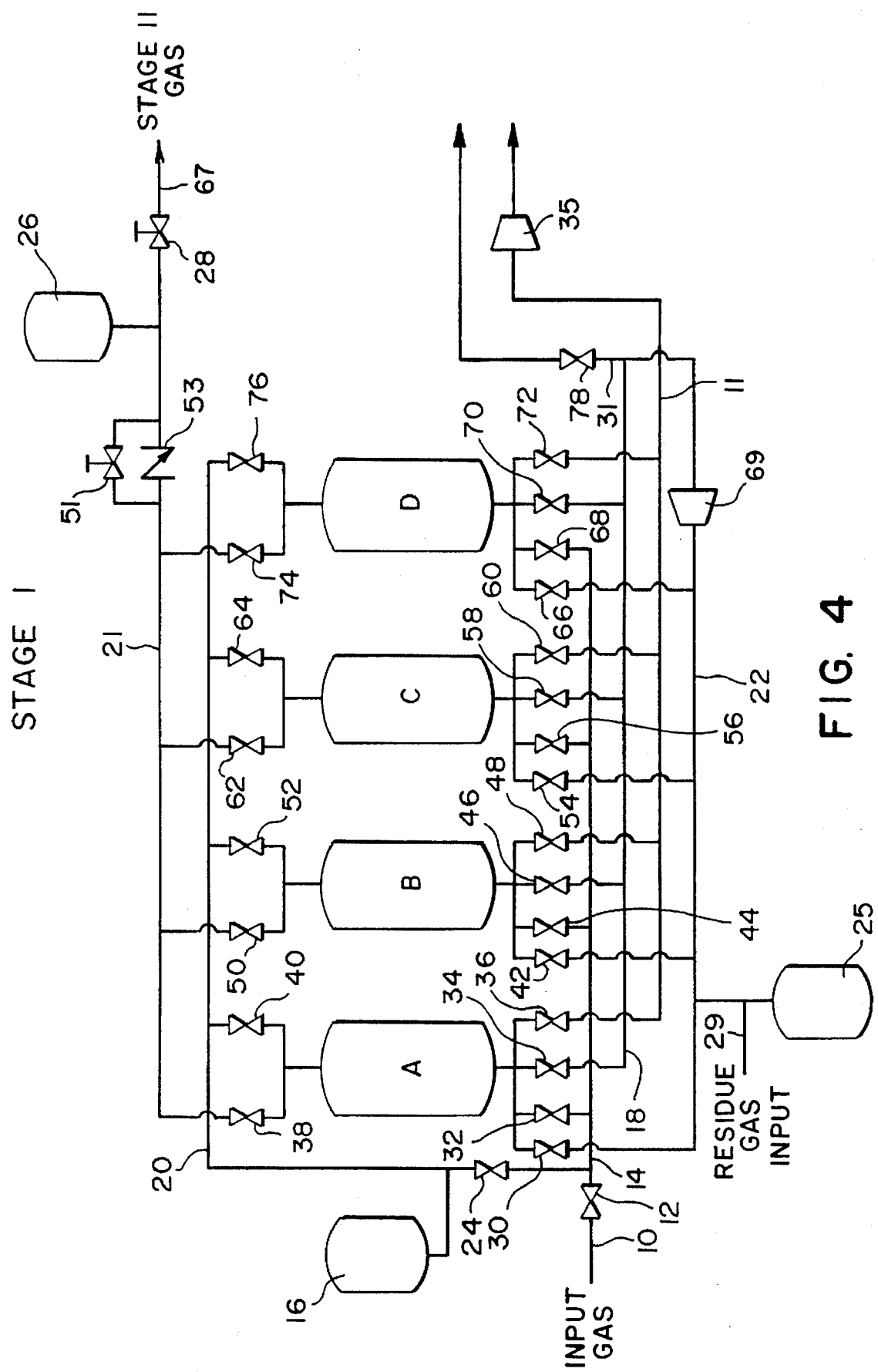
FIG. 4 is a detailed schematic diagram of the first stage pressure swing adsorption system.

The permeate stream is flowed to a two stage pressure swing adsorption plant which consists of four adsorbent beds as shown in FIGS. 4 and 5. Each adsorbent bed in stage I contains 11 cubic meters of an activated carbon adsorbent and each adsorbent bed in stage II contains 1 cubic meter of activated carbon adsorbent. The input gas is fed at a pressure of 65 psia and a flow rate of 2100 scfm to the stage I adsorbent beds. The phases of stage I are as set out in FIG. 6 and the phases of stage II are set out in FIG. 7. The valves are on a time cycle as described in Table 1 for stage I and Table 2 for stage II. An enriched helium gas stream having a helium gas content of 90 percent helium flows through conduit 39 at 127 scfm to stage II adsorbent beds. This enriched helium gas is further purified in stage II to a product helium gas having a helium content of 99.999 percent helium. This is produced at a flow rate of 80 scfm.

The gas from the adsorbent bed in the stage II evacuation phase and the gas from the stage II purge phase is recycled to the input gas to stage I. This gas has a helium content of 73 percent and flows at a rate of 47 scfm. The depressurization gas and the evacuation gas from stage I pressure swing adsorption is compressed and fed to the residue gas stream.

The process is operated continuously until a general maintenance is required.

What is claimed is:

1. A method for the separation of helium from an input gas stream containing helium and other gases comprising feeding said input gas from a source to a membrane separation unit at an elevated pressure, flowing a residue stream from said membrane separation unit, a first portion of said residue gas stream being flowed to the source of said input gas and flowing a permeate gas stream enriched in helium from said membrane separation unit to a first stage of a first stage and a second stage pressure swing adsorption unit and after processing said permeate gas in said first stage of pressure swing adsorption flowing the non-adsorbed portion of said permeate gas from said first stage of pressure swing adsorption to said second stage of pressure swing adsorption, said first stage of pressure swing adsorption and said second stage of pressure swing adsorption each containing a plurality of interconnected adsorbent beds, the first stage of pressure swing adsorption concentrating the helium in said input gas stream to greater than about 50 percent helium by volume and in said second stage of pressure swing adsorption concentrating said input gas stream to greater than about 95 percent helium by volume, a second portion of said residue gas stream being fed to said first stage of pressure swing adsorption as a processing gas.

2. A method for the separation of helium as in claim 1 wherein in said first stage of pressure swing adsorption there are six phases, each interconnected adsorbent bed undergoing said six phases for each complete cycle, said six phases comprising in sequence an adsorption phase, a recycle phase, a depressurization phase, an evacuation phase, a helium pressurization phase and a recycle feed pressurization phase, said second portion of said residue gas from said membrane separation unit being flowed to an adsorbent bed on said recycle phase with an effluent recycle feed gas enriched in helium flowing therefrom, said recycle feed gas being flowed to an adsorbent bed that is to enter said adsorption phase to pressurize said adsorbent bed to about the operating pressure of said first stage of pressure swing adsorption.

3. A method for the separation of helium as in claim 2 wherein there are at least four adsorbent beds, feeding said input gas stream to the input end of a first adsorbent bed of said first stage entering on said adsorption phase and selectively adsorbing said other gases, collecting a gas enriched in helium flowing from said first adsorbent bed of said first stage and flowing a portion thereof to said second stage pressure swing adsorption and a portion thereof to a second adsorbent bed of said first stage that has completed said evacuation phase and that has entered said helium pressurization phase, concurrently depressurizing a fourth adsorbent bed of said first stage and producing an effluent gas, flowing said second portion of said residue gas to said first adsorbent bed, upon the completion of said adsorption phase and the initiation of said recycle phase, flowing the effluent from said first adsorbent bed of said first stage during said recycle phase to a second adsorbent bed of said first stage upon the completion of said helium pressurization phase and that is to enter said adsorption phase to pressurize said second adsorbent bed of said first stage to about input gas stream pressure, and concurrently evacuating a third adsorbent bed of said first stage that has completed said depressurization phase to remove said other gases therefrom.

4. A method for the separation of helium as in claim 3 wherein some of said effluent gas from depressurizing said fourth adsorbent bed and said other gases from said third adsorbent bed which has undergone said evacuation phase are pressurized and flowed for use as an energy source in the operation of said separation method.

5. A method for the separation of helium as in claim 3 wherein said second adsorbent bed of said first stage is further pressurized with said input gas prior to entering an adsorption phase.

6. A method for the separation of helium as in claim 2 wherein in said second stage of pressure swing adsorption there are five phases, each interconnected adsorbent bed undergoing said five phases for each complete cycle said five phases comprising in sequence an adsorption phase, a depressurization phase, an evacuation phase, a purge phase and a helium pressurization phase, flowing a feed gas enriched in helium from said first stage to an adsorbent bed in said second stage undergoing said adsorption phase with a further enriched helium gas effluent flowing therefrom, flowing a first portion of said further enriched helium gas to purge other gases from an adsorbent bed in said purge phase, flowing a second portion of said enriched helium gas to an adsorbent bed that has completed said purge phase and which is to enter said adsorption phase to pressurize said adsorbent bed, and flowing a third portion of said further enriched helium to product.

7. A method for the separation of helium as in claim 6 wherein there are at least four adsorbent beds in said second stage of pressure swing adsorption, feeding said gas from said first stage as a feed gas to a first adsorbent bed in said second stage and collecting a first portion, a second portion and a third portion of a further enriched helium gas therefrom, concurrently depressurizing a fourth adsorbent bed of said second stage which has completed the production of said further enriched helium and which contains substantial amounts of said other gases, recovering an effluent second stage recycle gas from said fourth adsorbent bed of said second stage and pressurizing said second stage recycle gas to about the pressure of said feed gas to said second stage and flowing said second stage recycle gas to said first adsorbent bed of said second stage, concurrently reducing the pressure in a third adsorbent bed of said second stage to less than about ambient pressure and removing a portion of said other gases therefrom, concurrently flowing said first portion of further enriched helium from said first adsorbent bed of said second stage to a third adsorbent bed of said second stage which has completed said evacuation phase as a purge gas and further removing said other gases therefrom, and concurrently flowing said second portion of said further enriched helium to a second adsorbent bed of said second stage to increase the pressure within said second adsorbent bed of said second stage.

8. A membrane separation unit as in claim 7 wherein at least some of said other gases from said third adsorbent bed of said second stage are fed to the input to said membrane separation unit.

9. A membrane separation unit as in claim 7 wherein at least some of said other gases from said third adsorbent bed of said second stage are fed to the input to said first stage of pressure swing adsorption.

10. A method for the separation of helium as in claim 6 wherein the adsorbent within each of said adsorbent beds is an activated carbon.

11. A method for the separation of helium as in claim 2 wherein the adsorbent within each of said adsorbent beds is an activated carbon.

12. A method as in claim 1 wherein the source of said input gas is a natural gas pipeline.

13. A method for the separation of helium from an input gas stream containing helium and other gases comprising feeding said input gas from a source to a membrane separation unit at an elevated pressure, flowing a first portion of a residue gas stream from said membrane separation unit to the source of said input gas and flowing a permeate gas stream to a first stage of a first stage and second stage of pressure swing adsorption, each stage containing a plurality of interconnected adsorbent beds, said first stage of pressure swing adsorption concentrating the helium in said gas stream to greater than about 75 percent helium by volume and in said second stage of pressure swing adsorption concentrating said gas stream to greater than about 95 percent helium by volume, at least some of an off gas from the evacuation of an adsorbent bed in said second stage to below about ambient pressure being fed along with said input gas stream to the input of the first stage of pressure swing adsorption, said first stage consisting of at least four interconnected adsorbent beds, each adsorbent bed undergoing six phases for each complete cycle of pressure swing adsorption, said six phases comprising in sequence an adsorption phase, a recycle phase, a depressurization phase, an evacuation phase, a helium pressurization phase and a recycle feed pressurization phase, feeding said input gas stream to the input end of a first adsorbent bed of said first stage entering on said adsorption phase and selectively adsorbing said other gases, collecting a gas enriched in helium flowing from said first adsorbent bed of said first stage and flowing a portion thereof to a second adsorbent bed of said first stage that has completed said evacuation phase and that has entered said helium pressurization phase, concurrently depressurizing a fourth adsorbent bed of said first stage and collecting a first effluent gas, flowing a second portion of said residue gas to said first adsorbent bed of said first stage upon the completion of said adsorption phase and the initiation of said recycle phase, flowing the effluent from said first adsorbent bed of said first stage during said recycle phase to a second adsorbent bed of said first stage upon the completion of said helium pressurization phase and that is to enter said adsorption phase to pressurize said second adsorbent bed of said first stage to about input gas stream pressure, concurrently evacuating a third adsorbent bed of said first stage that has completed said depressurization phase to remove said other gases therefrom and to collect a second effluent gas, flowing another portion of said gas enriched in helium to a second stage of pressure swing adsorption which consists of at least four interconnected adsorbent beds, each such adsorbent bed undergoing five phases for each complete cycle of pressure swing adsorption, said five phases comprising in sequence an adsorption phase, a depressurization phase, an evacuation phase, a purge phase and a helium pressurization phase, feeding said enriched helium gas from said first stage as a feed gas to a first adsorbent bed in said second stage and collecting three portions of a further enriched helium gas therefrom, concurrently depressurizing a fourth adsorbent bed of said second stage which has completed the production of said further enriched helium and which contains substantial amounts of said other gases, depressurizing and recovering an effluent second stage recycle gas from said fourth adsorbent bed of said second stage and pressurizing said second stage recycle gas to about the pressure of said feed gas to said second stage and flowing said second stage recycle gas to said first adsorbent bed of said second stage, concurrently reducing the pressure in a third adsorbent bed of said second stage to less than about ambient pressure and removing a portion of said other gases therefrom, concurrently flowing a first portion of further enriched helium from said first adsorbent bed of said second stage to a third adsorbent bed of said second stage which has completed said evacuation phase as a purge gas and further removing said other gases therefrom, concurrently flowing a second portion of said further enriched helium to a second adsorbent bed of said second stage to increase the pressure within such adsorbent bed, and flowing some of said other gases from said third adsorbent bed of said second stage to at least one of said first adsorbent bed in said first stage and the input gas to said membrane separation unit.

14. A method for the separation of helium as in claim 13 wherein the adsorbent in each adsorbent bed is an activated carbon adsorbent.

15. A method for the separation of helium as in claim 13 wherein said second adsorbent bed of said first stage is further pressurized with input gas prior to entering an adsorption phase.

16. A method for the separation of a component gas from an input gas stream containing said component gas and other gases comprising feeding said input gas from a source to a membrane separation unit at an elevated pressure, flowing a residue gas stream from said membrane separation unit, flowing a permeate gas stream from said membrane separation unit to a pressure swing adsorption separation unit, and flowing a portion of said residue gas to said pressure swing adsorption unit for use in regenerating said pressure swing adsorption unit.

17. A method for the separation of a component gas as in claim 16 wherein there are at least two interconnected stages of pressure swing adsorption, said portion of said residue gas being flowed to said first stage of pressure swing adsorption for use in regenerating said first stage of pressure swing adsorption.

18. A method for the separation of a component gas as in claim 17 wherein in said second stage of pressure swing adsorption there is produced a gas stream rich in said component gas and a gas stream substantially depleted in said component gas, at least a portion of said gas stream substantially depleted in said component gas flowed to the input gas stream to said membrane separation unit.

19. A method for the separation of a component gas as in claim 17 wherein in said second stage of pressure swing adsorption there is produced a gas stream rich in said component gas and a gas stream substantially depleted in said component gas, at least a portion of said gas stream substantially depleted in said component gas flowed to the permeate gas for input to said first stage pressure swing adsorption unit.

20. A method for the separation of a component gas as in claim 16 wherein said component gas is helium.

* * * * *

UNITED STATES PATENT AND TRADEMARK OFFICE
CERTIFICATE OF CORRECTION

PATENT NO. : 5,632,803
DATED : May 27, 1997
INVENTOR(S) : STONER et al.

It is certified that error appears in the above-indentified patent and that said Letters Patent is hereby corrected as shown below:

Figure 3, line 4, "HELLIUM" should be --HELIUM--.

Column 9, line 1, "dosed" should be --closed--.

Column 9, line 19, "dosed" should be --closed--.

Column 12, line 40, "dosed" should be --closed--.

Signed and Sealed this

Twenty-fifth Day of November, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT    5,632,803

DATED     May 27, 1997

INVENTOR(S)   Stoner et al

It is certified that error appears in the above-identified patent and that said Letters Patent is hereby corrected as shown below On the title page, item [75] Inventors  "Reingold" should be --Reinhold--

Signed and Sealed this

Third Day of February, 1998

Attest:

BRUCE LEHMAN

Attesting Officer    Commissioner of Patents and Trademarks